United States Patent
Laukhuf

(10) Patent No.: US 6,455,777 B1
(45) Date of Patent: Sep. 24, 2002

(54) USING BARE STRANDED COPPER WIRE FOR GROUNDING TO CONDUIT OR STEEL CHANNEL

(75) Inventor: Gregg Edward Laukhuf, Bryan, OH (US)

(73) Assignee: Dekko Engineering, Inc., Butler, IN (US)

( * ) Notice: Subject to any disclaimer, the term of this patent is extended or adjusted under 35 U.S.C. 154(b) by 0 days.

(21) Appl. No.: 09/527,880

(22) Filed: Mar. 20, 2000

(51) Int. Cl.$^7$ ................................. H02G 3/04
(52) U.S. Cl. ................. 174/68.3; 174/6; 52/220.7; 52/239
(58) Field of Search ............... 174/6, 10, 37, 174/38, 39, 68.1, 70 C, 70 S, 72 R, 95, 96, 100, 68.3, 51; 52/220.3, 220.7, 239; 138/108, 113, 167

(56) References Cited

U.S. PATENT DOCUMENTS

| | | | |
|---|---|---|---|
| 2,739,998 A | | 3/1956 | Kretzer .................... 174/6 |
| 3,135,469 A | * | 6/1964 | Hanson .................... 174/48 |
| 3,655,905 A | | 4/1972 | Ray ....................... 174/11 R |
| 3,909,502 A | * | 9/1975 | Lacan ..................... 174/48 |
| 4,166,195 A | * | 8/1979 | Schwab ................... 174/95 |
| 4,791,237 A | | 12/1988 | Sherman ................ 174/40 R |
| 4,808,072 A | | 2/1989 | Moore et al. ............. 416/5 |
| 4,861,940 A | | 8/1989 | Carpenter, Jr. ............ 174/6 |
| 4,885,428 A | | 12/1989 | Roberts ................... 174/6 |
| 5,062,246 A | * | 11/1991 | Sykes ...................... 52/221 |
| 5,218,167 A | * | 6/1993 | Gasque .................... 174/37 |
| 5,383,318 A | * | 1/1995 | Kelley et al. ............ 52/220.7 |
| 5,784,841 A | * | 7/1998 | Nowell ................... 52/220.5 |
| 5,901,756 A | * | 5/1999 | Goodrich ................. 138/167 |
| 5,930,100 A | * | 7/1999 | Gasque .................... 174/108 |
| 5,956,445 A | * | 9/1999 | Deitz et al. ............... 174/24 |
| 6,201,687 B1 | * | 3/2001 | Murray .................... 174/48 |
| 6,218,612 B1 | * | 4/2001 | McKitrick et al. ......... 174/48 |

FOREIGN PATENT DOCUMENTS

| | | |
|---|---|---|
| GB | 105411 | 4/1917 |
| GB | 853615 | 11/1960 |

* cited by examiner

Primary Examiner—Dean A. Reichard
Assistant Examiner—Adolfo Nino
(74) Attorney, Agent, or Firm—Taylor & Aust P.C.

(57) ABSTRACT

An electrical power distribution system including a hollow elongated enclosure such as flexible metal conduit, a modular furniture distribution, or similar enclosure has a plurality of elongated insulated conductors within the enclosure, and a plurality of wraps spaced along, and each surrounding, the plurality of insulated conductors. There is also a flexible electrical ground conductor having an exposed electrically conductive surface within the enclosure making electrical contact with the enclosure interior in a plurality of randomly distributed regions along the length of the enclosure thereby randomly grounding enclosure regions throughout the extent of elongation. The wraps may comprise strips of adhesive tape confining the plurality of insulated conductors in a bundle and excluding the flexible conductor from the bundle.

6 Claims, 2 Drawing Sheets

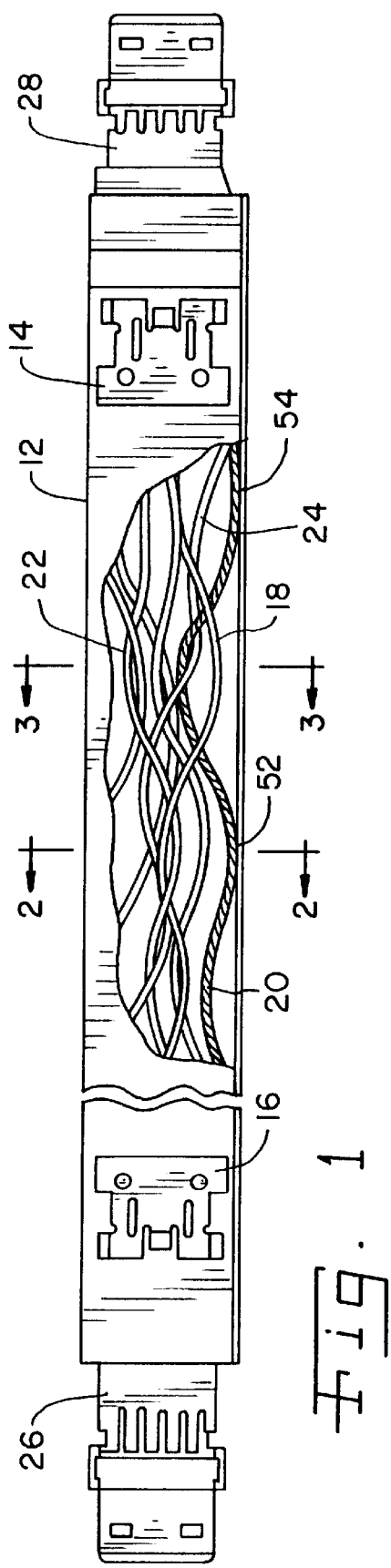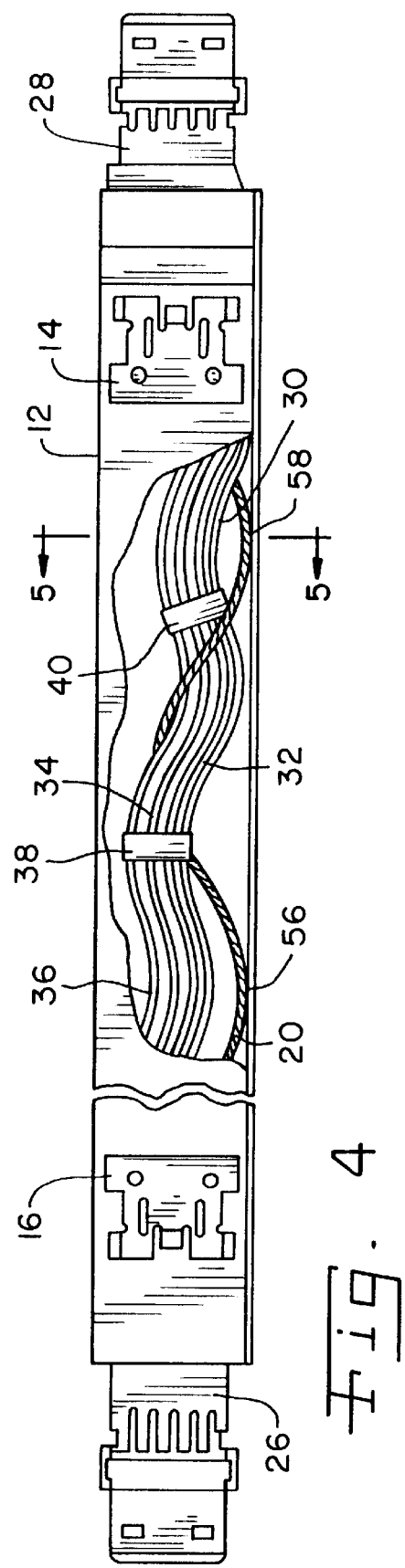

USING BARE STRANDED COPPER WIRE FOR GROUNDING TO CONDUIT OR STEEL CHANNEL

BACKGROUND OF THE INVENTION

1. Field of the invention

The present invention relates to electrical distribution systems of the type having insulated conductors disposed within a conduit, steel housing, or similar conductive enclosure, for example, of the type which are used in conjunction with prefabricated and prewired office partitions or room divider panels and other modular furniture, and more particularly to methods and apparatus for effecting an electrical grounding of the enclosures of such distribution systems.

2. Description of the Related Art

Design considerations often call for electrical wiring to be enclosed in a metal housing or enclosure. For example, the power distribution lines used in prewired office space partitions and other modular furniture may be enclosed within a distribution housing, and within flexible steel conduits coupling distributions. Present techniques for grounding a conduit or electrical distribution housing include external clamping structures coupled to one or both ends of the conduit, a ground wire within the enclosure clamped to the enclosure, and a ground bar which pierces the insulation of a grounded wire and also contacts the surface of the part to be grounded. These techniques are relatively costly, labor intensive, and often ineffective in providing adequate grounding of enclosures such as extra-flex conduit having a significant linear resistance.

SUMMARY OF THE INVENTION

The present invention provides a technique of grounding enclosures which is less labor intensive, provides grounding of the enclosure in a number of regions throughout the extent of the enclosure thereby complying with ground impedance requirements for extra-flex conduits, and reduces the amount of scrap material created during assembly of conductors into the enclosure.

The invention comprises, in one form thereof, a technique of assembling electrical conductors within an elongated electrically conductive enclosure in which a plurality of insulated conductors and a flexible stranded insulation-free conductor are inserted into the enclosure in such a way as to effect probabilistic contact between the insulation-free conductor and the enclosure. This probabilistic contact may be enhanced by bundling the insulated conductors to one another while excluding the insulation-free conductor, for example, by gathered the insulated conductors together into a bundle and wrapping strips of adhesive material about the insulated conductors at a plurality of spaced apart locations.

An advantage of the present invention is that no special connection or assembly step is required to ground the enclosure.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a side elevation view, partly in cross-section, of an electrical distribution incorporating the invention in one form;

FIG. 4 is a side elevation view, partly in cross-section, of an electrical distribution incorporating the invention in another form;

Figure 2:
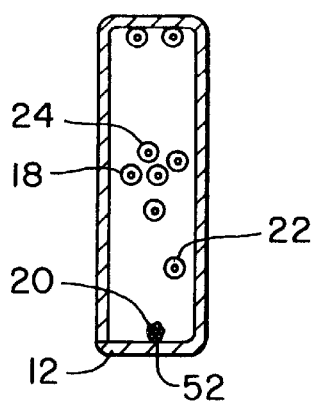
FIG. 2 is a view in cross-section along lines 2—2 of FIG. 1.

Corresponding reference characters indicate corresponding parts throughout the several views. The exemplifications set out herein illustrates one preferred embodiment of the invention, in one form, and such exemplifications are not to be construed as limiting the scope of the invention in any manner.

DETAILED DESCRIPTION OF THE INVENTION

Referring now to the drawings and particularly to FIG. 1, there is shown an electrical distribution or raceway 12 of the type frequently used in prewired modular furniture. The distribution is typically made of steel or other electrically conductive material and at least has an electrically conductive inner surface portion. The distribution has electrical outlets or receptacles 14 and 16 for receiving office or other equipment plugs. A number of insulated electrical conductors such as 18, 22 and 24 are disposed within the distribution 12 and receive power by way of connectors 26 or 28. Several distributions may be linked together by such connectors. A stranded copper wire or similar flexible conductor 20, which is electrically grounded, extends along the distribution 12. The flexible conductor 20 has no insulation and makes electrical contact with the distribution inner surface in a number of regions such as shown at 52 and 54 thereby effectively grounding the distribution.

Figure 3:
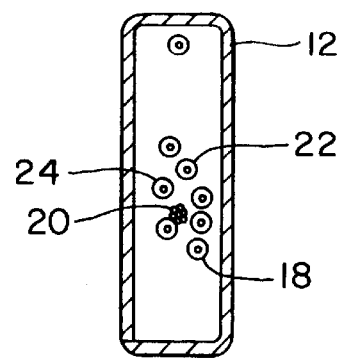
FIG. 3 is a view in cross-section along lines 3—3 of FIG. 1.

It may happen that the ground conductor 20 is isolated from the conductive distribution interior by some of the insulated conductors such as illustrated in FIG. 3. FIG. 4 illustrates one technique for increasing the likelihood of achieving adequate grounding. The several insulated conductors such as 30, 32, 34 and 36 are gathered together in a bundle and held bundled by periodic strips such as the tape strips 38 and 40. The stranded conductor 20 is excluded from the bundle thereby minimizing the likelihood of the conductor 20 being isolated from the housing interior by the insulated conductors. This concept is readily apparent from a comparison of FIGS. 3 and 5.

Figure 6:
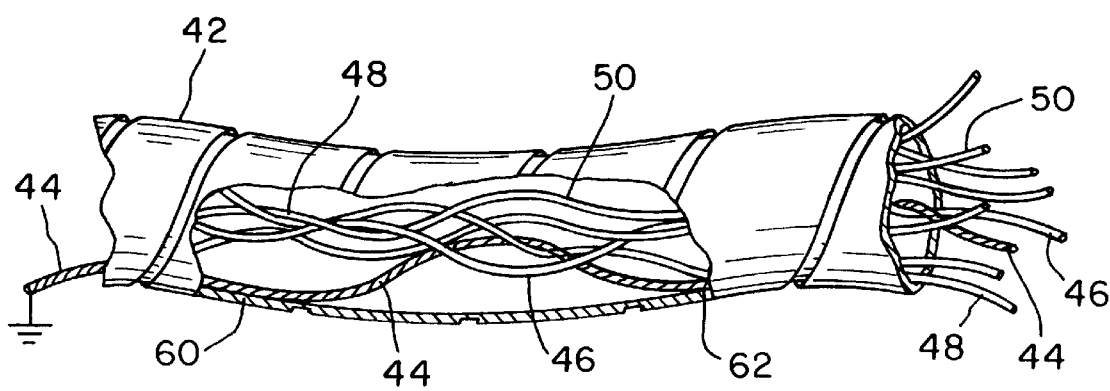
FIG. 6 is a side elevation view, partly in cross-section, of a flexible steel conduit incorporating the invention in a further form.

In FIG. 6, an illustrative section of flexible steel conduit 42 contains insulated conductors such as 46, 48, and 50 along with a stranded insulation-free copper conductor 44 which is connected to an electrical ground at the left end thereof. The grounding is similar to that shown in FIGS. 1—3. The stranded conductor 44 touches and grounds several regions such as 60 and 62 of the conduit 42 interior surface.

Contact between the flexible conductors or ground wires 20 and 44 and the distribution 12 or flexible steel conduit 42 has been described as effecting probabilistic contact or contact at randomly distributed locations along the enclosure. "Randomly" is not used in the narrow sense of probability theory, rather, it expresses a lack of certainty. For example, if a certain enclosure region is grounded, the probability that a closely adjacent region is also grounded is much greater than if nothing near the second region is grounded because the ground conductor is close to the enclosure in that area. The contact occurs randomly along the enclosure because it is not known where nor if contact will occur. There are numerous ways to define a probability measure for this grounding technique. For example, the inner surfaces of the enclosures illustrated may be thought of as being subdivided into a number n of circular or rectangular annuli. Numerous replications of an experimental insertion of a certain number of insulated conductors and a ground conductor may be performed and the number of annuli in which grounding contact occurs, for each replication, counted. A histogram may then be drawn with the number of annuli along the length of the enclosure as abscissa and the number of annuli found to be grounded as ordinate. If, for example, seven out of all the replications of the experiment yielded grounding of 23 annuli, the rectangle of the histogram located at n=23 would be 7 units high. As the number of annuli in the subdivision is increased, the histogram tends to become a smooth continuous frequency distribution. With the frequency distribution established by an adequate number of replications, the probability of achieving at least a certain number of grounded annular regions along the enclosure for the particular enclosure geometry, and the number and type of conductors, is simply the area under the distribution to the right of the particular number.

Figure 5:
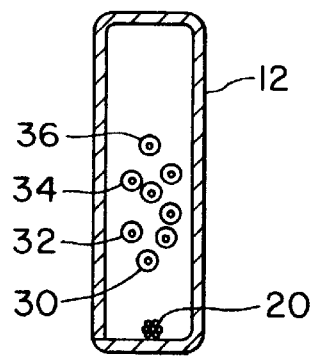
FIG. 5 is a view in cross-section along lines 5—5 of FIG. 4.

The particular distribution is a function of the geometry of the enclosure, the number and rigidity of the conductors and numerous other factors. If it is desired to increase the probability of achieving adequate grounding, that is, to skew the distribution further toward the right, any of several techniques could be employed. The gathering or bundling together of some or all of the insulated conductors as shown in FIGS. 4 and 5 enhances the likelihood of achieving at least some specified number of grounded annuli. Also, making the ground conductor 20 or 44 of a greater number of strands, or of less tightly twisted strands increases the ground conductor flexibility and serves to skew the distribution further to the right. Of course, a reduction of the number of insulated conductors or increasing the number of ground conductors would also achieve an increase in the likelihood of achieving adequate grounding.

In summary, the probabilistic grounding of an elongated electrically conductive enclosure is achieved by introducing a flexible stranded insulation-free conductor into the enclosure along with a plurality of insulated conductors, bundling the insulated conductors together, terminating the insulation-free conductor near at least one end thereof to an electrical ground, and allowing the insulation-free conductor to contact the enclosure interior in a plurality of randomly distributed locations along the elongated extent thereof. The bundling enhances the random grounding by preventing the insulated conductors from isolating the insulation free conductor from the enclosure. For flexible conduit having significant linear resistance, the conventional technique of providing grounding clamps at one or both conduit ends leaves a central conduit portion which is not effectively grounded. The grounding of numerous intermediate conduit regions provided by the present invention solves this problem.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical power distribution system, comprising:
   a hollow elongated conductive enclosure;
   a plurality of elongated insulated conductors disposed within the enclosure;
   a plurality of wraps spaced along, and each surrounding, the plurality of insulated conductors; and
   a flexible electrical conductor having an exposed electrically conductive surface within the enclosure making electrical contact with the enclosure interior in a plurality of randomly distributed regions along the length of the enclosure.

2. The electrical power distribution system of claim 1, wherein each of the wraps comprises a strip of adhesive tape confining the plurality of insulated conductors in a bundle and excluding the flexible conductor from the bundle.

3. The electrical power distribution system of claim 1, wherein the flexible electrical conductor comprises an insulation-free stranded copper wire conductor.

4. The electrical power distribution system of claim 1, wherein the flexible electrical conductor is terminated near at least one end to an electrical ground.

5. The electrical power distribution system of claim 1, wherein the hollow elongated enclosure comprises a flexible metal conduit.

6. The electrical power distribution system of claim 1, wherein the hollow elongated enclosure comprises a modular furniture distribution.

* * * * *